May 16, 1944.  C. F. MARSCHNER ET AL  2,349,103
MEANS OF FLUSH FABRIC ATTACHMENTS
Filed July 2, 1941
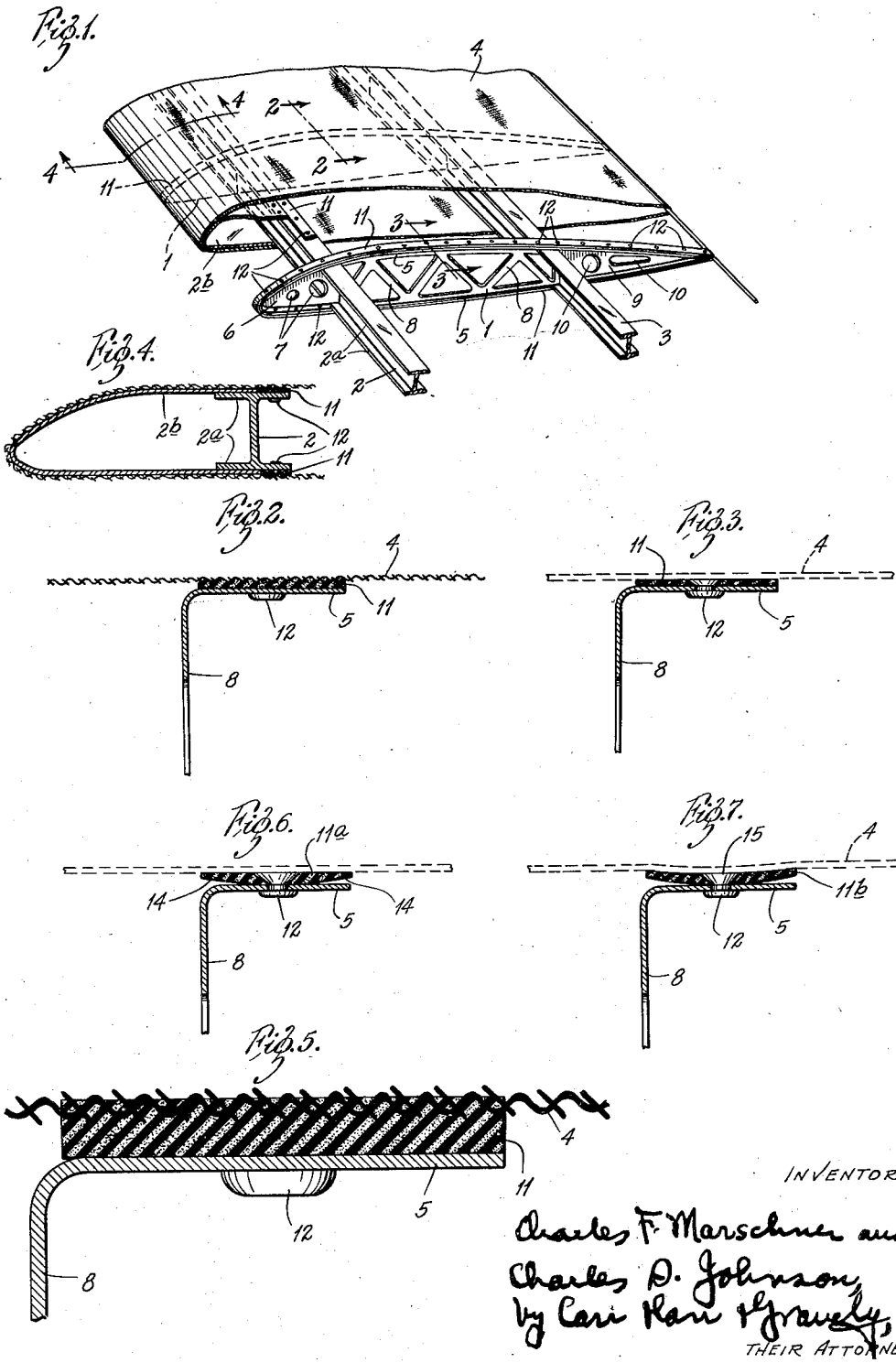
INVENTORS:
Charles F. Marschner and
Charles D. Johnson,
by Carr Kerr & Gravely,
THEIR ATTORNEYS.

Patented May 16, 1944

2,349,103

UNITED STATES PATENT OFFICE 2,349,103

MEANS OF FLUSH FABRIC ATTACHMENT

Charles F. Marschner and Charles D. Johnson, Kirkwood, Mo., assignors to McDonnell Aircraft Corporation, Robertson, Mo., a corporation of Maryland Application July 2, 1941, Serial No. 400,804

5 Claims. (Cl. 244—132)

Our invention relates to airplanes and more particularly to a flush fabric attachment for securing airplane fabric to an airplane framework.

Attempts have been made to secure airplane fabric to the ribs and frame of an airplane by cementing it directly thereto with some sort of adhesive. However, these attempts have been unsatisfactory in practice, as the bond has been insufficient to withstand the stresses and strains acting upon the fabric. This is due to the fact that cementing directly to the ribs or frame is difficult, and, particularly so, if the ribs and frame are of metal and also to the fact that the surface to which the fabric is to be bonded is of limited area; thus requiring exceptionally strong bonding.

Our invention has for its principal objects a means for attaching airplane fabric to the ribs or framework of an aircraft which is simple and requires only a few parts; which permits the fabric to be quickly and inexpensively secured to the plane; which may be used with any ordinary rib or frame design, which will not increase the weight of the airplane over the methods now used and which will strengthen the structure.

The invention consists principally in securing plastic strips to the ribs or framework of an airplane by mechanical means such as rivets or screws, putting the fabric in place and attaching the fabric to the ribs or framework by applying a solvent and/or an adhesive to the outside of the fabric over the strips which will penetrate the fabric and upon drying will bond the fabric to the strips. It also consists in the parts and combinations and arrangements of parts hereinafter described and claimed.

In the accompanying drawing which forms part of the specification and wherein like reference numerals refer to like parts wherever they occur, Fig. 1 is a perspective view of a portion of an airplane wing embodying our invention, Fig. 2 is a sectional view taken on the line 2—2 in Fig. 1, Fig. 3 is a sectional view taken on the line 3—3 in Fig. 1, Fig. 4 is a sectional view taken on the line 4—4 in Fig. 1, Fig. 5 is an enlarged view similar to Fig. 2 showing the airplane fabric bonded to a plastic strip mechanically secured to a rib; and Figs. 6 and 7 are views similar to the view shown in Fig. 3 of modifications.

In Fig. 1 of the drawing, a portion of a typical wing is shown comprising ribs 1, a front spar or beam 2 having flanges 2a, a rear spar or beam 3, a nosing 2b extending to the rear flange of the front spar and the fabric covering 4. Each rib has upper and lower rib flanges 5 extending from the leading edge to the trailing edge of the wing, a nose web 6 adjacent to the leading edge of the wing with openings 7 therethrough for lightening the structure, rib struts 8 and a trailing edge web 9 with holes 10 therethrough to lighten the structure. While the invention is illustrated with a two spar type of wing, it may be used with any type of wing design or rib or frame structure. The wing structure shown in the drawing is preferably of metal but it may be of any other suitable material.

To secure the wing fabric 4 on the wing structure, thin strips 11 of Pyralin or other brand of cellulose nitrate or cellulose acetate or any other suitable dope soluble plastic are secured with rivets or screws 12 or other suitable mechanical means to the outermost faces of the upper and lower rib flanges 5 and to the nosing 2b parallel with the rear flanges 2a of the front spar. Preferably, the strips are secured to the rib flanges 5 before the rib has been assembled with the rest of the wing structure. More or fewer strips 11 may be used, as needed, and they may be secured to other parts of the framework.

The airplane fabric 4 which may be of any suitable material that has been cut to proper size and shape and otherwise prepared is then placed in position around the wing and a suitable solvent such as acetone is applied to the outside of the fabric 4 directly over the plastic strips. Instead of using a solvent, a suitable bonding substance such as cellulose nitrate or cellulose acetate may be used. These cellulose nitrate or cellulose acetate products are commonly called dope. The solvent or bonding substance penetrates the fabric 4 and upon drying, the fabric is securely bonded to the plastic strips 11 which in turn are mechanically secured to the ribs. When a solvent is used, the solvent penetrating the fabric temporarily dissolves the upper portion of the plastic strips and the dissolved plastic permeates the fabric above and upon the solvent evaporating, the plastic hardens, bonding the fabric securely to the plastic strips. It is also possible for the solvent to be applied directly to the strips before the fabric is put in place.

After the airplane has been covered with fabric 4 it is preferably finished by the application of a dope, which is preferably a prepared substance either of cellulose acetate or cellulose nitrate. This doping shrinks the fabric tightly in place, making it taut, and creates a glossy, impervious surface on the fabric that excludes damaging sunlight which would cause a rapid deterioration of the cloth.

The modification shown in Fig. 6 is generally similar to that described above with the exception that the marginal portions 14 of the bottom of the plastic strip 11a are beveled. The advantage of this is that the construction is more flexible and the plastic strips 11a will follow the movement of the fabric as it bows under variations of air pressure. Thus, the flexibility of this construction will lessen the tendency of the fabric to pull away from the bonding strip.

The modification in Fig. 7 is generally similar to Fig. 6 with the exception that the top 15 of the plastic strip 11b is slightly dished. Thus, this construction will have even greater flexibility than that shown in Fig. 6.

The advantages of our construction are numerous. Bonding or cementing directly to the airplane framework or ribs is eliminated. The bond between the plastic strips and fabric is exceptionally strong and will withstand the strains and pressures applied to the wing. The fabric attachment means may be used with any wing or rib design and provides a simple and efficient flush fabric attachment. Furthermore, it provides a certain flexibility which will permit the plastic strips to follow the movement of the fabric.

Obviously, numerous modifications may be made and we do not wish to be limited to the precise constructions shown.

What we claim is:

1. An aircraft comprising a framework having a strip of solid preformed plastic mechanically secured to an outer surface thereof, a fabric mounted on said framework and bonding means independent of the securing means for said strip for bonding said fabric to said plastic strip.

2. An airplane wing comprising ribs having substantially rigid preformed strips of plastic mechanically secured thereto, and a fabric covering for said wing secured to said strips by temporarily softening the fabric engaging surfaces thereof, whereby said surfaces, upon hardening, bond said fabric to said strips.

3. An airplane wing comprising ribs having strips of plastic mechanically secured thereto, the marginal portions of the bottoms of said strips adjacent to said ribs being beveled, airplane fabric mounted on said ribs, and bonding means bonding said fabric to said strips.

4. An airplane wing comprising ribs having strips of plastic mechanically secured thereto, the marginal portions of said strips adjacent to said ribs being beveled and the outer surfaces thereof being dished, airplane fabric mounted on said ribs, and bonding means bonding said fabric to said strips.

5. An airplane wing comprising ribs having strips of plastic mechanically secured thereto, the marginal portions of said strips adjacent to said ribs being beveled, airplane fabric mounted on said ribs and dope bonding said fabric to said strips.

CHARLES F. MARSCHNER.
CHARLES D. JOHNSON.